United States Patent [19]

Oka et al.

[11] Patent Number: 4,468,733
[45] Date of Patent: Aug. 28, 1984

[54] MULTI-COMPUTER SYSTEM WITH PLURAL SERIAL BUS LOOPS

[75] Inventors: Toshihisa Oka, Katsuta; Hiroaki Nakanishi, Hitachi; Ryoichi Takamatsu, Hitachi; Takayuki Morioka, Hitachi; Masakazu Okada, Hitachi; Hideyuki Hara, Hitachi; Hirokazu Kasashima, Hitachi, all of Japan

[73] Assignee: Hitachi, Ltd., Tokyo, Japan

[21] Appl. No.: 270,549

[22] Filed: Jun. 4, 1981

[30] Foreign Application Priority Data

| Jun. 4, 1980 [JP] | Japan | 55-74337 |
| Jun. 4, 1980 [JP] | Japan | 55-74338 |
| Jun. 4, 1980 [JP] | Japan | 55-74339 |
| Jun. 4, 1980 [JP] | Japan | 55-74340 |

[51] Int. Cl.³ .................................. G06F 15/16
[52] U.S. Cl. ..................................... 364/200
[58] Field of Search ... 364/200 MS File, 900 MS File; 370/88

[56] References Cited

U.S. PATENT DOCUMENTS

| Re. 28,811 | 5/1976 | Pierce | 370/88 |
| 3,659,271 | 4/1972 | Collins | 364/200 |
| 3,742,144 | 6/1973 | Brandenburg | 370/88 |
| 3,755,789 | 8/1973 | Collins | 364/200 |
| 3,879,710 | 4/1975 | Maxemchuk | 364/200 |
| 3,890,471 | 6/1975 | Hachenburg | 370/88 |
| 3,958,226 | 5/1976 | Kuroda | 364/200 |
| 3,979,723 | 9/1976 | Hughes | 370/88 X |
| 4,019,176 | 4/1977 | Cour | 364/900 |
| 4,031,512 | 6/1977 | Faber | 364/200 X |
| 4,223,380 | 9/1980 | Antonaccio | 364/200 |

Primary Examiner—Raulfe B. Zache
Attorney, Agent, or Firm—Antonelli, Terry & Wands

[57] ABSTRACT

A multi-computer system includes a plurality of data processors and at least one I/O device which is commonly accessible by the data processors. A plurality of serial bus loops are configured in hierarchy with interbus linkage devices disposed between adjacent layers of the hierarchy. The data processors are connected to a plurality of first layer serial bus loops and the I/O device which is commonly accessible by the data processors is connected to a second layer of serial bus loop. The interbus linkage devices control linkage among the plurality of serial bus loops and carry out routing control for a start command from the data processor to the I/O device, routing control for an interruption to report the end of I/O device operation, routing control for data transfer, routing control for a request interruption and exclusive use control of the shared I/O device.

4 Claims, 10 Drawing Figures

FIG. 4

(A) | SYN | A1 Y1 | A2 X1 | A3 Z1 | C | DC | I | ANS |

(B) | SYN | A1 X1 | A2 Z1 | A3 0 | C | DC | I | ANS |

(C) | SYN | A1 Z1 | A2 0 | A3 0 | C | DC | I | ANS |

FIG. 5

(A) | SYN | A1 Z1 | A2 0 | A3 0 | C | DC | I | ANS |

(B) | SYN | A1 X1 | A2 Z1 | A3 0 | C | DC | I | ANS |

(C) | SYN | A1 Y1 | A2 X1 | A3 Z1 | C | DC | I | ANS |

MULTI-COMPUTER SYSTEM WITH PLURAL SERIAL BUS LOOPS

BACKGROUND OF THE INVENTION

The present invention relates to a multi-computer system having a plurality of data processors and at least one I/O device which is commonly accessible by the data processors, and more particularly to a multi-computer system with hierarchical serial bus loops coupled by interbus linkage devices.

In order to enhance the reliability of a system, a multi-computer system has been proposed in which a plurality of data processors (hereinafter referred to as CPU's) and input/output devices (hereinafter referred to as I/O devices) are connected to the system so that when a CPU or I/O device fails, another CPU or I/O device backs up the failed one. Such a system needs an I/O device which can be commonly accessed by a plurality of CPU's. An example of a known approach to this problem is to connect the CPU's respectively to exclusive buses with the I/O devices which are to be exclusively accessed by the respective CPU's being connected to these exclusive buses, to connect the I/O devices which are to be commonly accessed by the respective CPU's to a common bus which is to be shared by the CPU's, and to interconnect the exclusive buses and the common bus through a switching mechanism (for example, see Japanese Patent Publication No. 55-4299 of the present assignee, entitled "A multidimension addressing system in a multi-computer system"). In this example, one of the exclusive buses is selectively connected to the common bus by the switching mechanism so that the CPU connected to the selected exclusive bus can access the I/O devices connected to the common bus. Since the switching mechanism connects one of the exclusive buses to the common bus upon request by the CPU, the CPU's are commonly accessible by an I/O device connected to the common bus or vice versa. If a CPU which is carrying out a job of a commonly accessible I/O device fails, another CPU can be connected by the switching mechanism so that the substituted CPU continues to carry out the job.

According to such a multi-computer system, the system does not go down even if one of the exclusive buses fails because the exclusive buses operate independently to each other. Also, the processing ability is enhanced by the independency of the operation of the respective buses.

However, in a system with parallel interface type I/O operation in which data is transferred in parallel through parallel signal lines connecting the CPU's and the I/O devices, the number of signal lines increases extremely, especially in a large scale system.

On the other hand, a data highway system in which a single serial interface line is looped has been proposed (for example, see U.S. Pat. No. 4,002,847). When a plurality of CPU's and a plurality of I/O devices are connected to the same serial bus loop, any CPU can access any I/O device and hence the back-up for a failed CPU can be readily carried out. However, if the loop fails at some location in such a system, the entire system goes down and hence the advantage of high reliability in the multi-computer system is lost. The reliability may be enhanced by providing double or triple loops, but the processing efficiency is reduced. The processing efficiency is also reduced because all of the CPU's and the I/O devices are connected to a single loop.

SUMMARY OF THE INVENTION

It is an object of the present invention to provide a multi-computer system which possesses the high reliability and the high performance of a multi-computer system and the advantages of a serial bus loop.

It is another object of the present invention to provide a multi-computer system with serial bus loop hierarchy which provides a simple route control mechanism, connecting a CPU issuing a start command and an I/O device to be driven.

It is another object of the present invention to provide a multi-computer system with serial bus loop hierarchy which provides simple route control for an interruption by an end of I/O operation.

It is another object of the present invention to provide a multi-computer system with serial bus loop hierarchy which provides simple routing control for an interruption by a request of an I/O device.

It is another object of the present invention to provide a multi-computer system with serial bus loop hierarchy which provides exclusive use control of I/O devices without any interference load of CPU's and bus.

According to a feature of the present invention, there is provided a multi-computer system comprising a plurality of serial bus loops in a first layer to which CPU's are connected and at least one serial bus loop in a second layer which connects the plurality of serial bus loops of the first layer through interbus linkage devices, and at least one I/O device connected to the serial bus loop of the second layer and hence being accessible from any one of the CPU's.

According to another feature of the present invention a serial bus loop of a third layer is further connected to the serial bus loop of the second layer through an interbus linkage device, and an I/O device which is accessible from any one of the CPU's is connected to the serial bus loop of the third layer.

According to another feature of the present invention, the CPU's and the I/O devices are connected to the corresponding serial bus loops through respective stations, and each of the stations and the interbus linkage devices transmits and receives an information word to and from the bus loop in the form of a transmission frame including an I/O device number (address) field having at least a plurality of sub-fields and a control code field.

According to another feature of the present invention, the interbus linkage device which interconnects the bus loops controls signal routing when a start command is issued from a CPU to an I/O device. The interbus linkage device checks the equality between a first sub-field and its own address. When the equality is detected, it shifts the I/O device number field by one sub-field and sends it out to the bus loop on the I/O device side.

According to another feature of the present invention, the interbus linkage device includes storage means for each I/O device number for storing the presence or absence of the start command from the PCU. When a frame indicating an interruption by end of operation of the I/O device is received, corresponding storage means is retrieved through the I/O device number contained in the frame. If the presence of the start signal is contained in the storage means, the linkage device sends out the end interruption frame to a bus loop which is closer to the corresponding CPU and changes the content of the storage means to the absence of the start command to carry out the routing control for the end interruption.

According to another feature of the present invention, the interbus linkage device has respective storage means for storing a signal indicating permission or non-permission of request interruption for each I/O device number. When a request interruption takes place, the linkage device looks up the storage means by the I/O device number to carry out the routing control for the request interruption in accordance with the content of the storage means.

According to another feature of the present invention, the interbus linkage device has respective storage means for storing a signal indicating the reserved status of a CPU for each I/O device number. When the CPU issues a start command to an I/O device, the linkage device looks up the storage means through the I/O number in the frame to carry out the exclusive use control in accordance with the content of the storage means.

BRIEF DESCRIPTION OF THE DRAWINGS

The invention will be more fully understood from the following detailed description made in conjunction with the accompanying drawings, in which:

FIG. 4 illustrates changes in frame format transmitted from a CPU to an I/O device of FIG. 1;

FIG. 5 illustrates changes in frame format transmitted from the I/O device to the CPU of FIG. 1;

DETAILED DESCRIPTION OF THE PREFERRED EMBODIMENT

Figure 1:
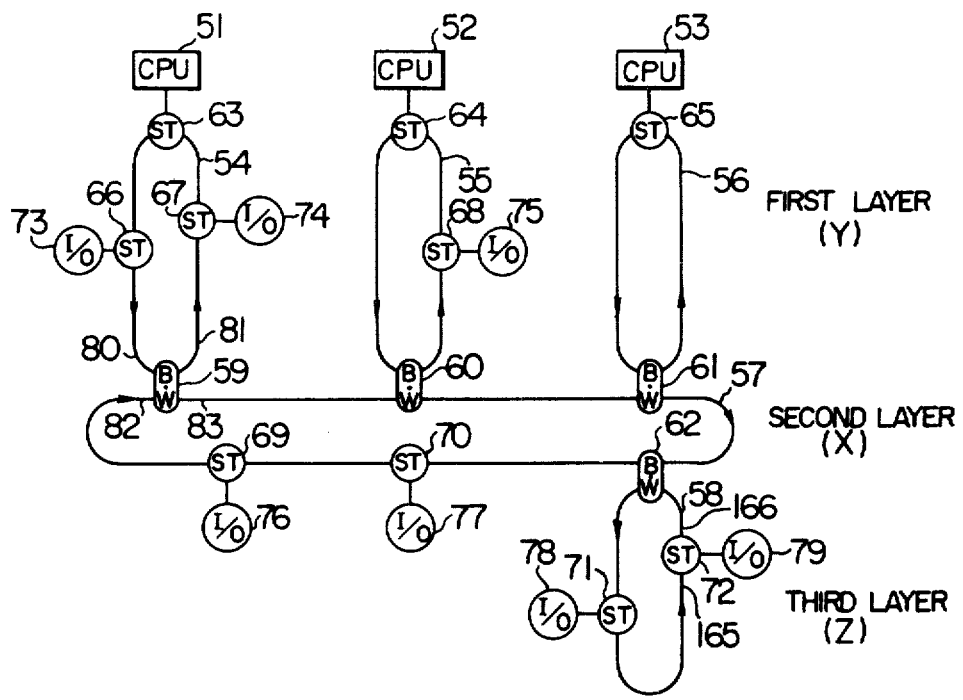
FIG. 1 shows a configuration of one embodiment of a multi-computer system in accordance with the present invention.

FIG. 1 diagrammatically shows a multi-computer system including a plurality of CPU's associated with respective serial loop buses and at least one I/O device accessible from any of the CPU's. In FIG. 1, reference numerals 54 to 58 denote looped buses of the serial transfer type, in which numerals 54 to 56 denote bus loops of a first layer, the numeral 57 denotes a bus loop of a second layer and numeral 58 denotes a bus loop of a third layer. The bus loops of the first layer are referred to as Y bus loops, the bus loop of the second layer is referred to as an X bus loop and the bus loop of the third layer is referred to as a Z bus loop. The CPU's 51 to 53 are connected to the Y bus loops 54 to 56 through CPU stations 63 to 65, respectively. The I/O devices 73 to 79 are connected to the corresponding Y bus loops 54 to 56, the X bus loop 57 and the Z bus loop 58 through I/O stations 66 to 72, respectively. Symbols ST in FIG. 1 represent the stations and symbols I/O represent the input/output (I/O) devices. An I/O device can be connected to any bus loop through a station ST. The Y bus loops 54 to 56 and the X bus loop 57 are connected through interbus linkage devices 59 to 61, respectively, and the X bus loop 57 and the Z bus loop 58 are connected through an interbus linkage device 62. The interbus linkage devices 59 to 61 will be referred to as X bus windows and the interbus linkage device 62 will be referred to as a Z bus window, hereinafter. Symbol BW represents a bus window. The X bus windows 59 to 61 not only connect the Y bus loops 54 to 56 with the X bus loop 57, respectively, but also carry out routing control for information transfer and buffering of information. Similarly, the Z bus window 62 connects the X bus loop 57 to the Z bus loop 58 and carries out routing control for information transfer and buffering of information. The Y bus loops 54 to 56 are exclusive bus loops for the CPU's 51 to 53, respectively. The I/O device connected to each of the Y bus loops is exclusively accessed by the CPU connected to that bus loop. More particularly, the I/O devices 73 and 74 are accessed only by the CPU 51 and the I/O device 75 is accessed only by the CPU 52. The X bus loop 57 is a common bus loop for the CPU's 51 to 53 so that the I/O devices 76 and 77 can be accessed by any of the CPU's 51 to 53. The I/O devices 78 and 79 in the Z bus loop 58 which is connected to the X bus loop 57 through the Z bus window 62 can also be accessed by any of the CPU's 51 to 53.

Figure 2:
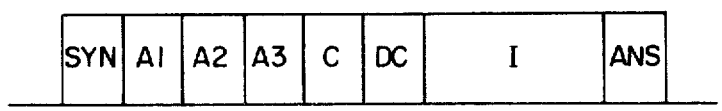
FIG. 2 shows an example of the frame format used on a serial bus loop of FIG. 1.

FIG. 2 shows a frame format on the bus loop. Symbol SYN represents an 8-bit synchronization code which synchronizes the frame format with the station and the bus window. Symbols $A_1$, $A_2$ and $A_3$ represent 5-bit address sub-fields and indicate addresses of an I/O device as viewed from respective bus loop levels. Namely, $A_1$, $A_2$ and $A_3$ progressively and jointly addresses an I/O device. It is to be noted that these sub-fields represent a receiver's address when information is transmitted from a CPU to an I/O device, but a sender's address when information is transmitted from an I/O device to a CPU. When information is placed on a Y bus loop from a CPU, sub-field $A_1$ represents a destined device address on the Y bus loop, the sub-field $A_2$ represents a destined device address on the X bus loop and the sub-field $A_3$ represents a destined device address of the Z bus loop. Symbol C represents an 8-bit control field and indicates properties of information field I on the bus loop and a direction of information transfer. Symbol DC represents an 8-bit field which indicates the number of bytes of the information field I. The information field I has a length ranging from one byte to 256 bytes. Symbol ANS represents an 8-bit answer field which is to be transmitted from an information receiver back to the sender. When a sender sends an information to a receiver, the field ANS is reset to zero. The field ANS is provided to report the status of the receiver and an error status. Detailed description of the error process is omitted here.

Figure 3:
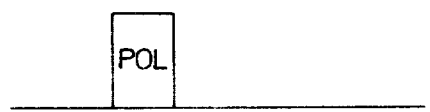
FIG. 3 shows a frame format in polling.

FIG. 3 shows a frame format in polling. Symbol POL represents an 8-bit polling code. The polling code also functions as a synchronizing code by which the devices are synchronized with the frame. Only one polling code is circulated on one loop. When a station or a bus window requires the transfer of information, i.e. when it is to function as a sender, it inhibits the sending of the polling code and instead sends out a frame as shown in FIG. 2. When the system starts up or is powered on, a predetermined station or bus window sends out the polling code to the bus loop. When one frame of information has been transferred, the sending station or bus window sends out the polling code to the bus loop to give a right of exclusive use to another station or bus window.

In order to explain properties of the bus loop hierarchy, let us consider the information transfer between the CPU 51 and the I/O device 79 connected to the Z bus loop 58 in FIG. 1. Thus, the transfer bus extends from CPU 51 through CPU station 63, Y bus loop 54, X bus window 59, X bus loop 57, Z bus window 62, Z bus loop 58 and I/O station 72 to I/O device 79. Let us assume that the address of the X bus window 59 on the Y bus loop is $Y_1$, the address of the Z bus window 62 on the X bus loop is $X_1$ and the address of the I/O station 72 on the Z bus loop is $Z_1$.

Details of the system will now be explained for five cases of information transfer. In the first case, the information is transferred from the CPU 51 to the I/O device 79. In this case, a command is issued from the CPU to the I/O device or data is transferred from the CPU to the I/O device. In the second case, data is transferred from the I/O device to the CPU. In the third case, an end interruption indicating the end of data transfer for a start instruction from the CPU is sent back. In the fourth case, a request interruption is issued to the connected CPU. In the fifth case, one CPU requests an access to an I/O device which is being used by another CPU and a reserved status is replied to the one CPU and thereafter when the data transfer with the other CPU has been completed to enable the data transfer with the one CPU, it is reported by an interruption.

Figure 6:
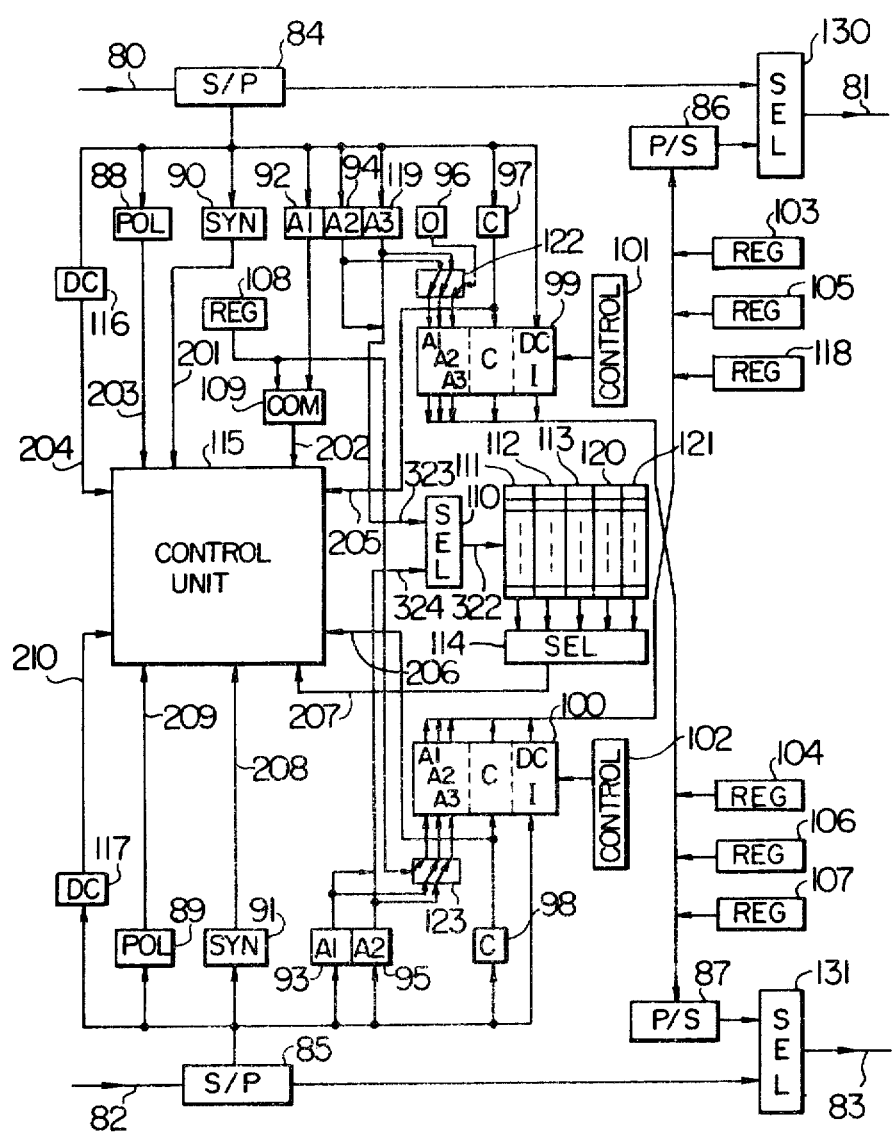
FIG. 6 shows a block diagram of an example of an interbus linkage device to be used in the system of FIG. 1.

The first case is now explained. When the CPU 51 issues a start command to the I/O device 79, the command is transferred to the CPU station 63 which serializes the parallel information into a frame, which is sent out to the Y bus loop in a format as shown in FIG. 4(A). The I/O stations and the bus windows on the Y bus loop always watch the signal on the bus loop and they decode the SYN code to synchronize their control units with the format on the bus loop. They check the equality between the subsequently sent address sub-field $A_1$ and their own addresses, and if equality is detected, the corresponding I/O station or bus window instructs its control unit to prepare for the reception of the information. FIG. 6 shows a block diagram of one example of the bus window. The configuration shown in FIG. 6 is common to both the X bus window and the Z bus window. The reference numerals in FIG. 6 indicate the elements as listed below.

| Reference Numeral | Element |
|---|---|
| 80, 81 | High layer loop |
| 82, 83 | Low layer loop |
| 84, 85 | Serial-to-parallel converter |
| 86, 87 | Parallel-to-serial converter |
| 88, 89 | Polling code detector |
| 90, 91 | Sync. code detector |
| 92, 93 | $A_1$ address register |
| 94, 95 | $A_2$ address register |
| 96 | Zero register |
| 97, 98 | Control code register |
| 99, 100 | Data buffer |
| 101, 102 | Buffer control circuit |
| 103, 104 | Sync. code register |
| 105, 106 | Answer code register |
| 107 | Polling code register |
| 108 | Self-address register |
| 109 | Comparator |
| 110 | Selector |
| 111 | Data handling table |
| 112 | Interruption handling table I |
| 113 | Interruption handling table II |
| 114 | Selector |
| 115 | Control unit |
| 116, 117 | Byte counter |
| 118 | Polling code register |
| 119 | $A_3$ address register |
| 120 | Exclusive use control table |
| 121 | Start control table |

The operation of the X bus window 59 on the Y bus loop is first explained, assuming that FIG. 6 shows the same. The high layer loops 80 and 81 are the Y bus loop 54 and the low layer loops 82 and 83 are the X bus loop 57. The SYN field is serially transmitted from the high layer loop 80. It is deseriallized by the serial-to-parallel converter (S/P) 84 into parallel data which is sent to a sync. code detector (SYN) 90 at every bit time. When the sync. code detector 90 detects the SYN field, it sends a control signal 201 to the control unit 115 to carry out frame synchronization.

Figure 7:
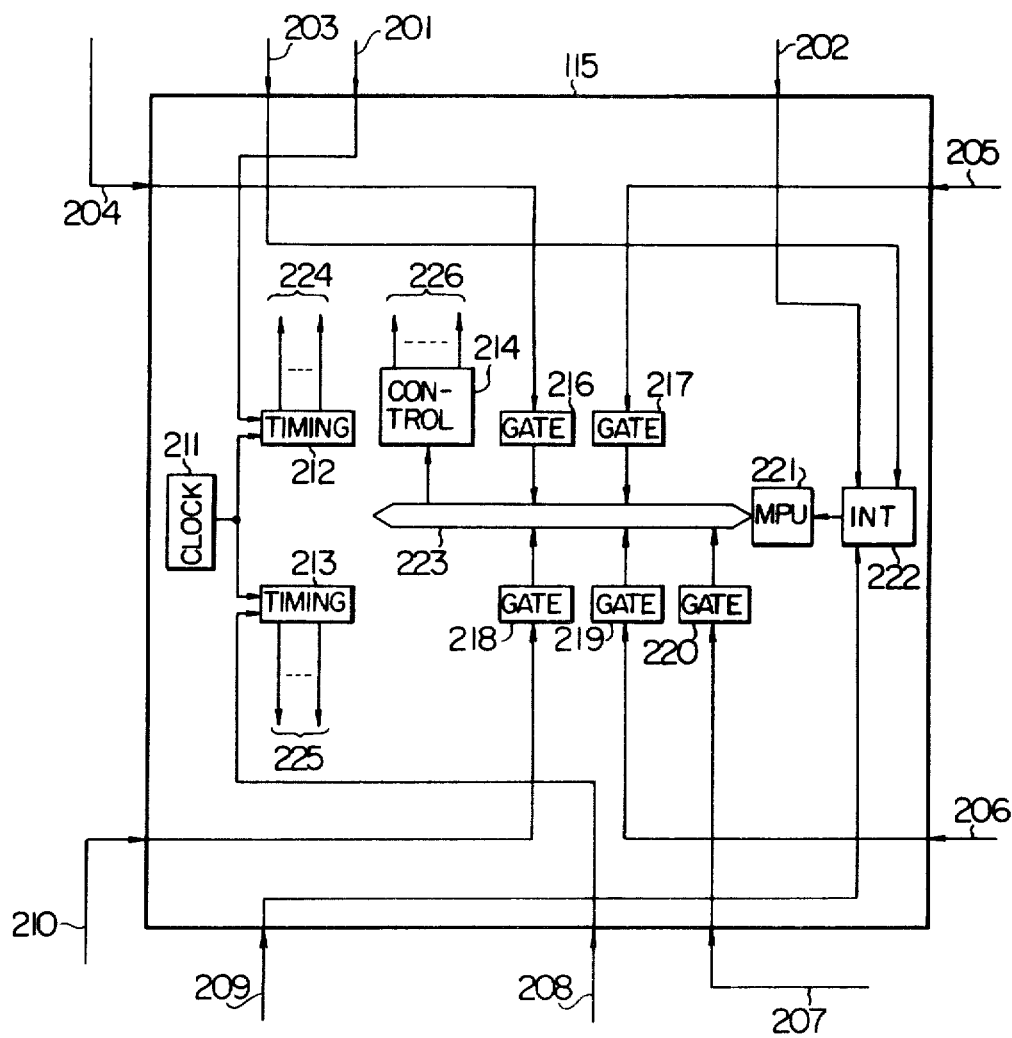
FIG. 7 shows a block diagram of an example of a control unit to be used in the linkage device of FIG. 6.

FIG. 7 shows a block diagram of one example of the control unit 115. The reference numerals in FIG. 7 represent elements as listed below.

| Reference Numeral | Element |
|---|---|
| 201 | Sync. signal |
| 202 | Address coincidence signal |
| 203 | Polling signal |
| 204 | Byte counter signal |
| 205 | Control code signal |
| 206 | Control code signal |
| 207 | Table readout signal |
| 208 | Sync. signal |
| 209 | Polling signal |
| 210 | Byte counter signal |
| 211 | Clock circuit |
| 212 | Loop bus timing circuit |
| 213 | Loop bus timing circuit |
| 214 | Control signal generator |
| 216 | Read-in gate |
| 217 | Read-in gate |
| 218 | Read-in gate |
| 219 | Read-in gate |
| 220 | Read-in gate |
| 221 | Microprocessor |
| 222 | Interruption control circuit |
| 223 | Microprocessor bus |
| 224, 225, 226 | Control signal |

The sync. signal 201 starts the loop bus timing circuit 212 of the control unit 115 to generate a control signal 224 for loading subsequently incoming fields into appropriate receiving registers. The outputs of the timing circuits are connected to many elements, but are not shown in FIG. 6 for simplifying the figure. The address sub-fields $A_1$, $A_2$ and $A_3$ are then sequentially received from the bus loop 80. The contents thereof are $Y_1$, $X_1$ and $Z_1$, respectively, on the Y bus loop as shown in (A) of FIG. 4. They are loaded into the $A_1$ address register 92, the $A_2$ address register 94 and the $A_3$ address register 119, respectively, through the serial-to-parallel converter 84. The address comparator 109 compares the content of the $A_1$ address register 92 with the content of the self-address register 108 which stores the address of that bus window on the Y bus loop. If equality is detected, the comparator 109 determines that the corresponding bus window has been selected on the Y bus loop and sends the address coincidence signal 202 to the control unit 115. It is to be noted that the address comparator 109 acts on only the content of the $A_1$ address register 92. When the address coincidence signal 202 is generated, the interruption control circuit (INT) 222 of the control unit 115 issues an interruption to the microprocessor (MPU) 221. In response thereto, the MPU 221 carries out the following processes.

When the C field is loaded into the control code register 97 following the address sub-fields $A_1$ to $A_3$, the MPU 221 reads it in through the read-in gate 217 and the bus 223. If the content relates to the start of an I/O device, the selector 110 is switched to set "1"s to the corresponding addresses ($X_1$ and $Z_1$ in the illustrated embodiment) of the data handling table 111 and the interruption handling table 112 such that the addresses of the data handling table 111, the interruption handling table 112 and the interruption handling table 113 are equal to the combination of the contents of the $A_2$ address register 94 and the $A_3$ address register 119.

Figure 10:
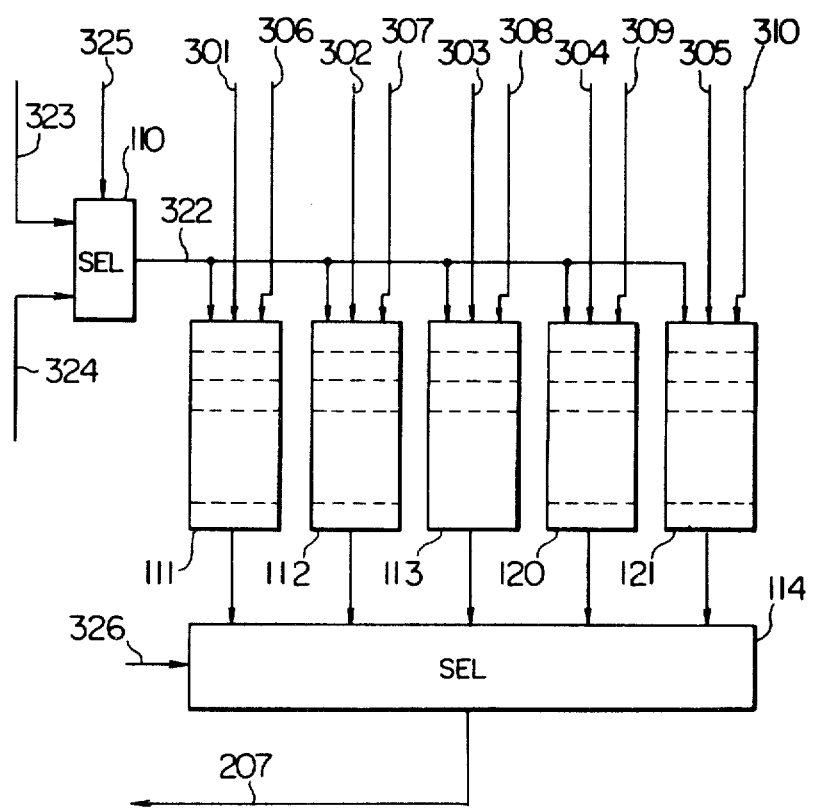
FIG. 10 shows an enlarged block diagram of the data handling table, interruption handling tables, exclusive use control table, and start control table of FIG. 6.

This mechanism will be described in more detail referring to FIG. 10 which shows the data handling table 111, the interruption handling tables 112 and 113, the exclusive use control table 120, and the start control table 121. Each of these tables 111, 112, 113, 120 and 121 are made of an IC memory of 1×N bits, where N is equal to the sum of the numbers of bits for the sub-fields $A_2$ and $A_3$.

Namely, these tables can store five informations for each address of the input/output devices located down stream of the bus window. The selector 110 changes over or selects the addressing signal 323 from the high layer loop 80 and the addressing signal 324 from the low layer loop 82 and forms an addressing signal 322 for the tables. All of the input data 301 to 305 and set command signals 306 to 310 for the tables and selection signals 325 and 326 for the selectors 110 and 114 are part of the control signals 226 issued from the control signal generator 214 shown in FIG. 7. Thus, write/read operations of these tables may be implemented by the software in the microprocessor 221. The DC field is then sent. The MPU 221 loads it into the byte counter 116 and the data buffer 99. At the same time, the contents of the $A_2$ address register 94, the $A_3$ address register 119 and the zero register 96, which always contains zero, are loaded to into the data buffer 99 through the left shifter 122 so that they form the $A_1$, $A_2$ and $A_3$ sub-fields of the frame to be sent to the low layer bus loop. In the illustrated example, the contents are $X_1$, $Z_1$ and O. The C field is similarly loaded into the data buffer 99. Each time one byte of the I field following the DC field is loaded into the data buffer 99, the MPU 221 decrements the byte counter 116 by one. When the content of the byte counter 116 reaches zero, the MPU 221 determines that the I field has ended and stops loading data into the data buffer 99. The MPU 221 checks for an error in the received information and loads the result into the answer code register 105 and switches the selector 130 to the high layer loop 81 in synchronism with the ANS field to send the result back to the sending station. When no error is included, a normal answer code instead of "0" is sent back. Detailed description of the error check is omitted here.

For the low layer loop 82, the polling code circulated in the low layer loop 82 is converted by the serial-to-parallel converter 85 and the converted signal is detected by the polling code detector 89 which supplies the polling signal 209 to the control unit 115. When the control unit 115 receives the polling signal 209, it issues an interruption to the MPU 221 by the interruption circuit 222 and the MPU 221 controls the selector 131 so as to not circulate the polling code to the low layer loop 83, but to transmit to the low layer loop 83 the information received from the high layer loop 80 through the parallel-to-serial converter 87. More particularly, the SYN, $A_1$, $A_2$, $A_3$, C, DC, I and ANS fields are sequentially sent out to the low layer loop 83 from the sync. code register 104, the data buffer 99 and the answer code register 106. The content of the frame on the low layer loop, i.e. X bus loop, is as shown by (B) of FIG. 4. It differs from the frame on the Y bus loop only in the address field, in that the $A_1$, $A_2$ and $A_3$ sub-fields are shifted left by one sub-field. Similar operation is expected in the Z bus window and the frame format on the Z bus loop is as shown by (C) of FIG. 4. Since the C field indicates the start instruction, "1's" are set into the corresponding addresses ($Z_1$, O in this case) of the handling tables of the Z bus window. Let us assume that the X bus window 59 has completed sending out the frame to the X bus loop 57 and the frame has circulated the loop and returned to the sender (i.e. X bus window 59) with the answer from the receiver. If the ANS field includes a code indicating the correct reception at the receiver, the transmission is terminated and the polling code is sent out to the low layer bus loop 83 from the polling code register 107 to release the loop.

Figure 8:
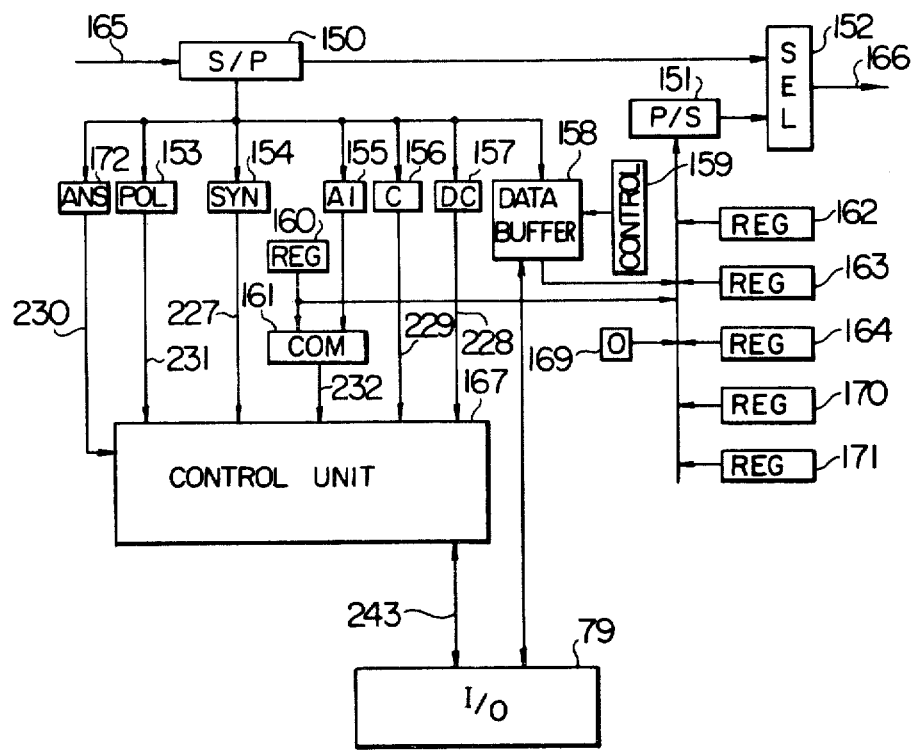
FIG. 8 shows a block diagram of an example of an I/O device station to be used in the system of FIG. 1.

Referring to FIG. 8, the operation of the I/O station is now explained. The reference numerals in FIG. 8 indicate elements as listed below.

| Reference Numeral | Element |
| --- | --- |
| 150 | Serial-to-parallel converter |
| 151 | Parallel-to-serial converter |
| 152 | Selector |
| 153 | Polling code detector |
| 154 | Sync. code detector |
| 155 | $A_1$ address register |
| 156 | Control code register |
| 157 | Byte counter |
| 158 | Data buffer |
| 159 | Buffer control circuit |
| 160 | Self-address register |
| 161 | Comparator |
| 162 | Sync. code register |
| 163 | Answer code register |
| 164 | Polling code register |
| 165, 166 | Bus loop |
| 167 | Control unit |
| 79 | I/O device |
| 169 | Zero register |
| 170 | Control code register |
| 171 | Byte count register |
| 172 | Answer code discrimination circuit |

The operation of receiving the data through the serial-to-parallel converter 150 and loading it into the data buffer 158 is similar to that of the bus window to receive the data from the high layer bus loop 80 and load it into the data buffer 99. More particularly, when the sync. code detector 154 detects the sync. code in the serial loop 165, it sends the sync. signal 227 to the control unit 167.

Figure 9:
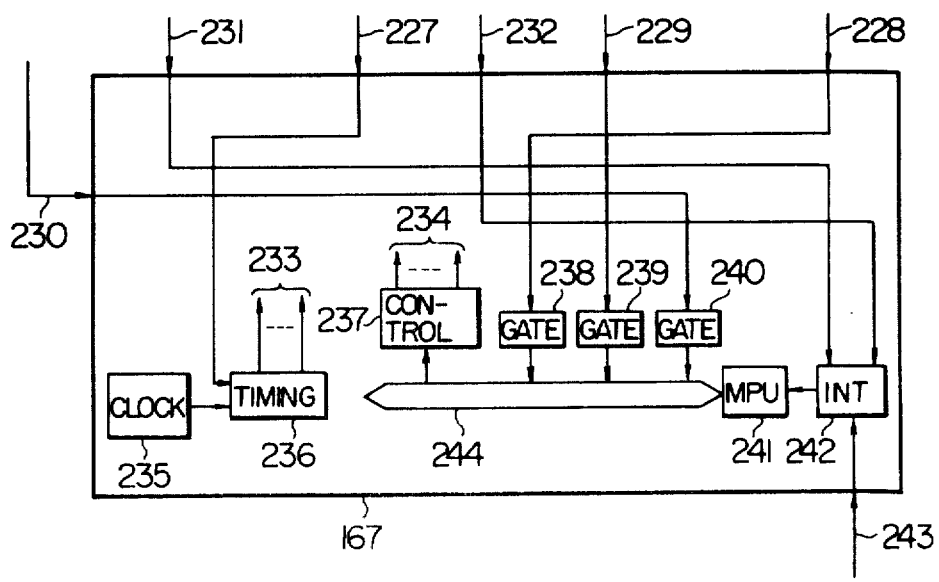
FIG. 9 shows a block diagram of an example of a control unit to be used in the station of FIG. 8.

FIG. 9 shows a block diagram of one example of the control unit 167. The reference numerals in FIG. 9 indicate elements as listed below.

| Reference Numeral | Element |
| --- | --- |
| 227 | Sync. signal |
| 228 | Byte count signal |
| 229 | Control code signal |
| 230 | Answer code check signal |
| 231 | Polling signal |
| 232 | Address coincidence signal |
| 233 | Loop bus timing signal |
| 234 | Control signal |
| 235 | Clock circuit |
| 236 | Loop timing circuit |
| 237 | Control signal generator |
| 238 | Read-in gate |
| 239 | Read-in gate |
| 240 | Read-in gate |
| 241 | Microprocessor |
| 242 | Interruption control circuit |
| 243 | Device interruption signal |
| 244 | Microprocessor bus |

The loop timing circuit 236 is started by the sync. signal 227 to produce the loop timing signal 233 in response to which the fields of the frame on the loop bus are loaded into the appropriate registers 155 to 157. When the $A_1$ sub-field is loaded into the $A_1$ address register 155, the comparator 161 compares it with the content of the self-address register 160. If equality is detected, it sends the address coincidence signal 232 to the control unit 167. In response thereto, an interruption is issued to the microprocessor 241 in the control unit 167 through the interruption control circuit 242 to start a control program. The microprocessor 241 reads in the contents of the control code register 156 and the byte counter 157 through the gates 239 and 238 and the bus 244 and acknowledges that it is an information transfer from the CPU 51 to the I/O device 79 and the number of transfer words. Based on this, the microprocessor 241 loads the content of the I field into the data buffer 158 and then sends out the data to the I/O device 79. It is to be noted that only the $A_1$ sub-field of the address field is referred to. The control unit 167 operates in response to the coincidence between the content of the $A_1$ sub-field and the content of the self-address register 160. This means that either the I/O station or the bus window is needed to compare its own address only with the $A_1$ sub-field. Thus, in the bus loop hierarchy, by dividing the address to the $A_1$, $A_2$ and $A_3$ sub-fields to represent the addresses of the bus window or the I/O station in the respective layers in the respective sub-fields and transmitting the frame as shown in FIG. 4 by the mechanism described above, the I/O stations can be accessed through any of the Y bus loops, the X bus loop and the Z bus loop.

The second case is now explained. Let us consider that the I/O device 79 has been started by the operation of the first case and the data is to be transferred from the I/O 79 to the CPU 51. The data is previously loaded into the data buffer 158 by the microprocessor 241 and the microprocessor 241 waits for the polling code from the bus loop 165. When the polling code is converted by the serial-to-parallel converter 150 and detected by the polling code detector 153, the polling signal 231 interrupts the control unit 167. In the control circuit 167, the polling signal 231 is applied to the interruption circuit 242 which interrupts the microprocessor 241. In response thereto, the control unit 167 switches the selector 152 to inhibit the circulation of the polling code and to send out the contents of the sync. code register 162, self-address register 160, zero register 169, control code register 170, byte count register 171, data buffer 158 and answer code register 163 to the bus loop 166 through the parallel-to-serial converter 151 and the selector 152. The frame format on the Z bus loop is as shown by (A) in FIG. 5. The C field loaded into the register 156 includes a code indicating the transfer to the CPU and the ANS field is zero. The address sub-fields $A_1$, $A_2$ and $A_3$ of the frame on the Z bus loop are identical to those of the first case (one shown by (C) of FIG. 4). The transfer of the frame to the Z bus window 62 is now explained. The configuration of the Z bus window 62 is similar to that shown in FIG. 6 and the frame is received from the low layer loop 82 (Z bus loop in this case). In the following description, FIG. 6 is deemed to represent the configuration of the Z bus window 62. As in the first case, when the sync. code detector 91 detects the sync. code, it sends the sync. signal 208 to the control unit 115. In response thereto, the loop bus timing circuit 213 shown in FIG. 7 is started to generate the control pulse 225 to load the subsequently transmitted fields into the appropriate registers. When the polling detector 89 detects the polling signal 209, it interrupts the microprocessor 221 through the interruption circuit 222 and starts the control program. The microprocessor 221 reads in the corresponding data through the read-in gate 218 to 220. After frame synchronization, the address sub-fields $A_1$ and $A_2$ are loaded into the $A_1$ address register 93 and the $A_2$ address register 95, respectively. The microprocessor 221 switches the selector 110 such that the addresses of the data handling table 111, the interruption handling table 112 and the interruption handling table 113 are equal to the combination of the contents of the $A_1$ address register 93 and the $A_2$ address register 95 ($Z_1$ and 0 in this case; "1" has been set in the data handling table at that address by the first case). Since the content of the C field represents the object data transfer, the content of the data handling table is looked up to find any "1". The setting of "1" at that address means that the data transfer (from the I/O device to the CPU) has been requested to the I/O device in the first case and hence the bus window must give the information of the low layer bus loop 82 to the high layer bus loop 81. Accordingly, when the "1" is detected in the data handling table 111, the data of the low layer bus loop is loaded into the data buffer 100. The contents of the self-address register 108, the $A_1$ address register 93 and the $A_2$ address register 95 are loaded into the data buffer 100 through the right shifter 123 so that they are used as the $A_1$, $A_2$ and $A_3$ sub-fields of the frame to be sent to the high layer bus loop 81. In this case, their contents are $X_1$, $Z_1$, O. Then the frame is sent out to the high layer bus loop 81. The polling detector 89 detects the polling code and the frame is sent out to the X bus loop in a format as shown by (B) in FIG. 5 under the control of the microprocessor 221. The microprocessor 221 in the control unit 115 resets the corresponding bits of the data handling table 111. The address sub-fields $A_1$, $A_2$ and $A_3$ are identical to those shown by (B) in FIG. 4. It differs from the frame on the Z bus loop only in that the $A_1$, $A_2$ and $A_3$ sub-fields are shifted right by one sub-field and the $A_1$ sub-field contains the address on the X bus loop of the Z bus window. This means that a similar operation is expected for the X bus window. The frame format on the Y bus loop is as shown by (C) in FIG. 5. In this manner, the object data is transferred from the I/O device 79 to the CPU 51. In this case, again, when the I/O station or the bus window receives the circulated data emanated from itself and detects the normal ANS field, it sends the polling code to the bus loop and releases the bus loop.

In the third case, the end interruption for the start command is sent back from the I/O device to the CPU 51. Although it is an interruption, it is basically a kind of information transfer from the I/O device to the CPU when viewed from the operation of the bus loop. Thus, a code indicating the end interruption is loaded into the C field in the frame and an interruption linkage parameter is loaded into the I field. The operation is similar to that of the second case except that the bus window looks up the data handling table 111 in the second case while it looks up the interruption handling table 112 in the present case. That is, the data handling table 111 is used for the object data transfer while the interruption handling table 112 is used for the end interruption. This is controlled by the control unit 115 by the C field on the frame transmitted from the low layer loop.

In the fourth case, the request interruption is issued from the I/O device 79 to the CPU 51. Unlike the end interruption, the request interruption takes place independently of the flow of the instructions from the CPU. In this case, the CPU issues to the I/O devices a command indicating which one of the I/O devices is to be connected. The CPU sends out the frame with the C field having the code indicating that the I/O device is to be connected to the CPU. This command is issued when the system is started up or the connections between the CPU's and the I/O devices are changed during the operation. When this command is issued, the frame is transmitted to the I/O device by the similar operation to that in the first case, but unlike the start instruction in the first case, the handling table in the bus window turns on the corresponding bits of the interruption handling table 113. Under such a condition, the I/O device issues the request interruption. Since the C field contains the code indicating the request interruption, the interruption handling table 113 is looked up when the frame passes through the bus window. If "1" is detected, the frame from the low layer bus loop is loaded into the data buffer 100. The data handling table 111 and the interruption handling table 112 turn off the bits when the service to the frame from the low layer bus loop is completed while the interruption handling table 113 does not change its state until a new I/O device connection command is received from the CPU. In this manner, in the case of the request interruption, the programmed CPU can be correctly interrupted.

In the fourth case, if none of the CPU's issues the command to connect the I/O device 79, the transmitted frame returns to the sender without any change. In this case, the I/O station 71 loads the ANS field to the answer code discrimination circuit 172. If the ANS field is "0", the answer code discrimination circuit 172 determines that the service is not available and resets the interruption of the I/O device. This prevents such a misoperation of the system which may occur when the non-connected I/O device erroneously issues a request interruption, which is not reset and causes ever lasting retry process to the bus loop. When the interruption is reset, an alarm may be issued to the external.

The fifth case is now explained. Let us assume that the start command is issued from the CPU 51 to the I/O device 79 in accordance with the procedure of the first case. A "1" bit indicating that the I/O device 79 has been reserved by the CPU 51 is set to the exclusive use control table 120 of FIG. 6 in a similar procedure to that of the look-up of the interruption handling table in the third case. If the CPU 52 issues a start command to the same I/O device 79, in this state, the exclusive use control table 120 is looked up in a similar procedure as that of the first case. When "1" is detected, the frame indicating the exclusive use is sent back to the CPU 52. At the same time, "1" is set into the start control table 121 in a similar procedure to memorize that the start instruction is temporarily withheld.

After a predetermined time period, when the end interruption is sent from the I/O device 79, the bus window receives it and looks up the start control table 121. If "1" is detected, the bus window sends a frame indicating the release of exclusive use to the CPU 52. The CPU is thus informed that the data transfer with the I/O device 79 is now ready.

What is claimed is:

1. A multi-computer system comprising:
   a plurality of data processors;
   at least one input/output device;
   a first layer of serial bus loop hierarchy including a plurality of serial bus loops, each being coupled with at least one of said data processors;
   a second layer of serial bus loop hierarchy including at least one serial bus loop coupled with said at least one input/output device;
   respective interbus linkage devices coupling the respective serial bus loops of said first layer with the serial bus loop of said second layer, the input/output device coupled with said second layer serial bus loop being accessible by the data processors coupled with at least two of said first layer serial bus loops through said first layer serial bus loop, a linkage device, and said second layer serial bus loop;
   a plurality of stations, each station coupling a data processor or the input/output device to a serial bus loop;
   each of said interbus linkage devices and said stations including means for sending and receiving a transfer frame carrying information between a data processor and said input/output device and comprising at least an input/output address field including a plurality of sub-fields for storing addresses representing a map of those of the linkage devices and the stations which are to be passed, in that order, by the transfer frame sent between one of the processors and the input/output device, respectively, and a control code field; and
   each one of said interbus linkage devices coupling the first and second layer serial bus loops including an address register for storing an address of the interbus linkage device on the associated first layer bus loop, means connected to said address register for detecting coincidence between the content of said address register and the content of a predetermined one of the sub-fields of the input/output address field of the transfer frame received from said associated first layer bus loop, means responsive to detection of coincidence by said detecting means for modifying said received transfer frame by shifting the content of the input/output address field thereof by one sub-field length and means for sending the modified frame to the associated second layer serial bus loop.

2. A multi-computer system according to claim 1, wherein each interbus linkage device connected between said first and second layer serial bus loops includes:
- storage means for storing a start command for the input/output device presented in the control code field of a received frame in a location of said storage means allotted to said input/output device;
- first means for receiving a second transfer frame from said second layer serial bus loop and for determining on the basis of the content of the control field of said second transfer frame whether said second transfer frame is to be sent to the associated data processor;
- second means responsive to the determination that said second transfer frame is to be sent to the associated data processor for determining whether a start command for the input/output device is stored in a location of said storage means designated by a predetermined one of the sub-fields of the input/output address field of said second transfer frame; and
- third means responsive to the determination that the start command is stored in said location for modifying said second transfer frame to shift its input/output address by one sub-field length prior to the modified second frame being sent to the associated first layer serial bus loop.

3. A multi-computer system according to claim 2, wherein said first means in each interbus linkage device includes means for determining whether an end interruption is present in the content of the control field of the second transfer frame and means responsive to the end interruption being present in said second transfer frame for rendering said third means operative and for cancelling the start command stored in said storage means.

4. A multi-computer system according to claim 1, wherein each one of the linkage devices further includes:
- storage means for storing a request interruption signal in a location allotted to the input/output device in response to a command from the associated data processor, said request interruption signal indicating whether a request interruption issued by the input/output device is acceptable or not;
- means for receiving a second transfer frame from the second layer serial bus loop and for checking the content of the location of the storage means designated by the predetermined one of the sub-fields when said second transfer frame includes a request interruption;
- and means for controlling the routing of said second transfer frame depending on the content of the location of said request interruption in said storage means.

* * * * *